March 10, 1931.  F. A. BARNES  1,796,232
REVERSIBLE ADJUSTING MECHANISM
Filed Jan. 23, 1928  2 Sheets-Sheet 1
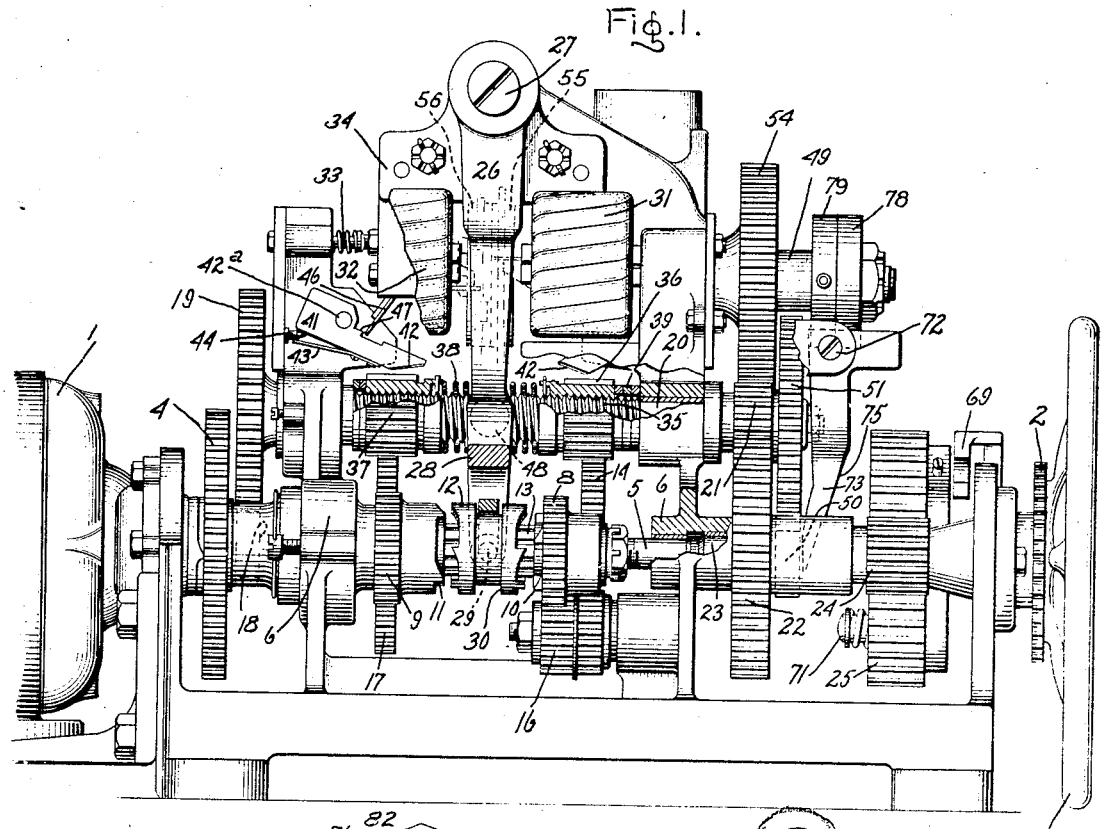
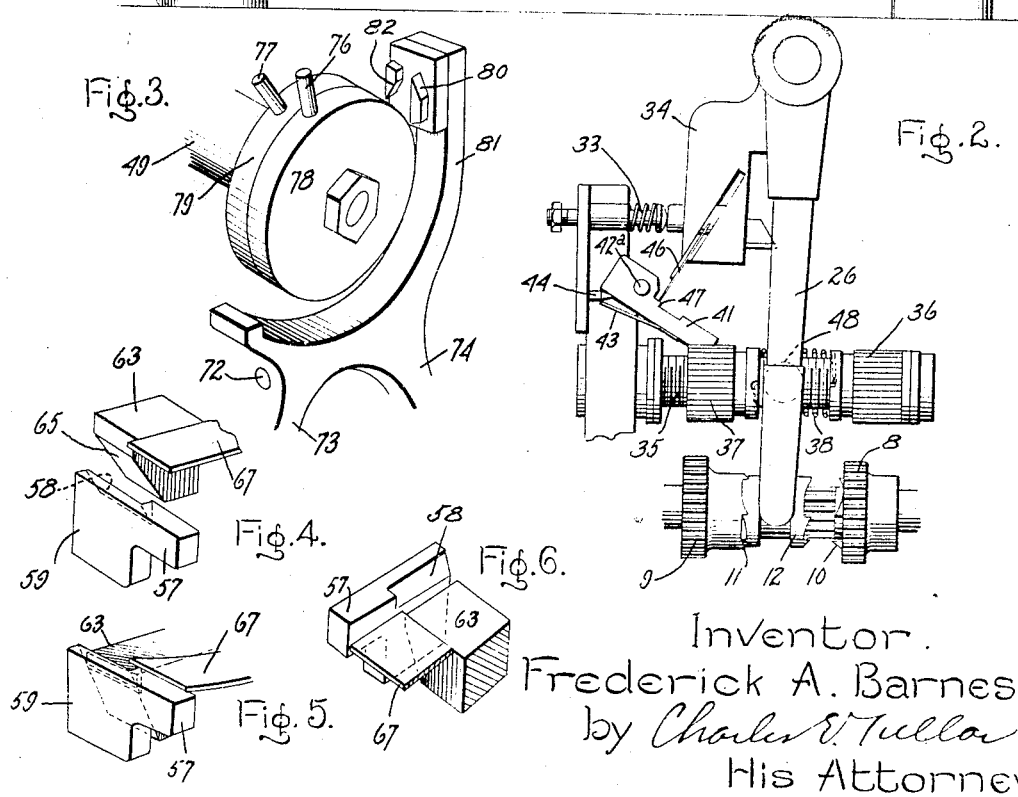
Inventor.
Frederick A. Barnes,
by Charles E. Tullar
His Attorney.

March 10, 1931.  F. A. BARNES  1,796,232
REVERSIBLE ADJUSTING MECHANISM
Filed Jan. 25, 1928    2 Sheets-Sheet 2
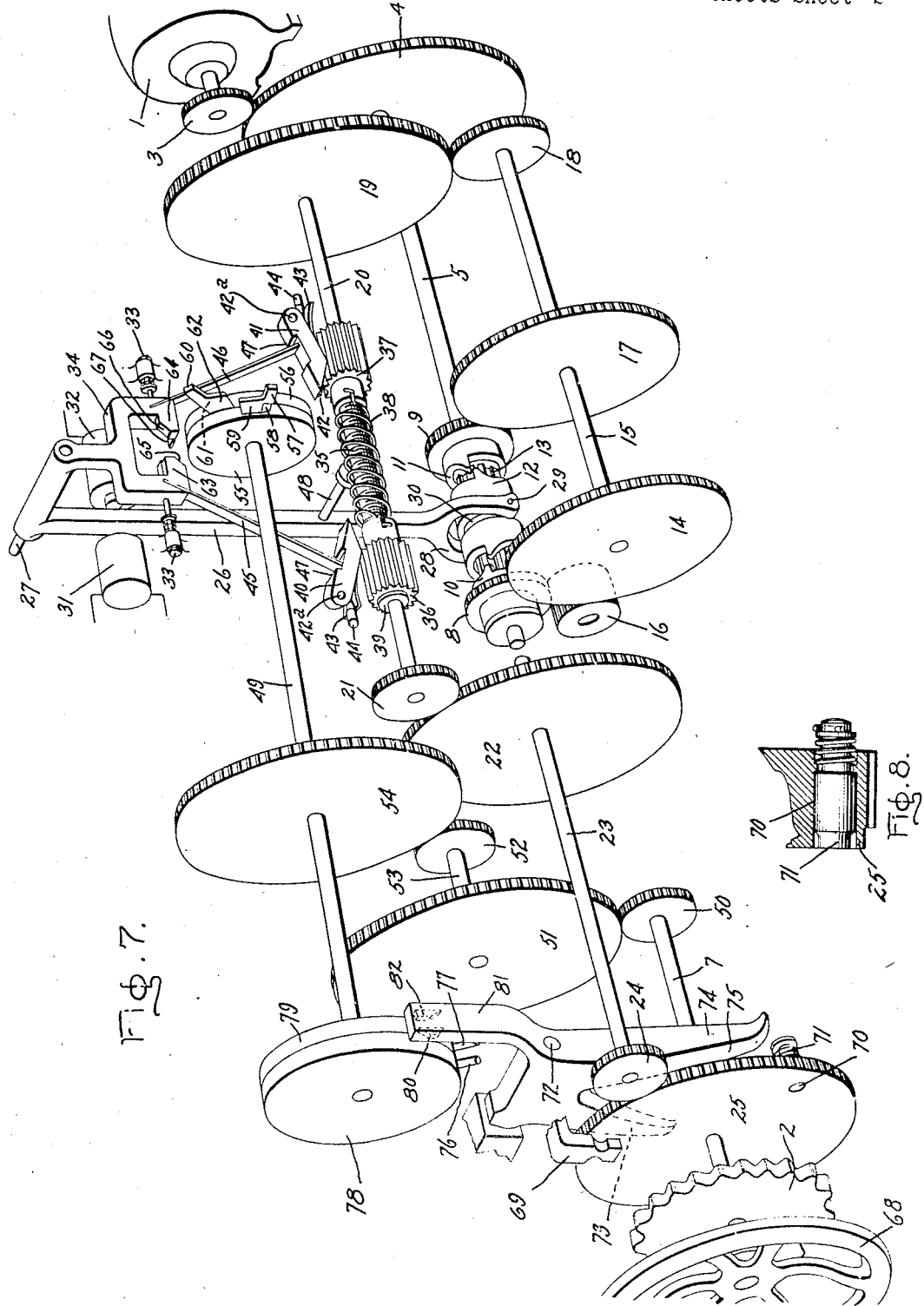
Inventor:
Frederick A. Barnes,
by Charles E. Mullen
His Attorney.

Patented Mar. 10, 1931

1,796,232

UNITED STATES PATENT OFFICE

FREDERICK A. BARNES, OF CLEVELAND, OHIO, ASSIGNOR TO BAILEY METER COMPANY, OF CLEVELAND, OHIO, A CORPORATION OF DELAWARE

REVERSIBLE ADJUSTING MECHANISM

Application filed January 25, 1928. Serial No. 249,465.

The present invention relates to reversible adjusting mechanisms for positioning a device to be adjusted in response to changes in some operating condition to be controlled. One application of the invention is that of positioning a furnace damper or a means such as a rheostat which controls combustible supply to a furnace in accordance with an operating condition appurtenant to the furnace. For example, the mechanism may be used in an automatic boiler furnace control system for adjusting a stack damper in response to changes in load on the boiler furnace. Or it may be used in such a system to adjust the rheostat of a motor-driven draft fan or a motor-driven fuel-feeding means. It is to be understood, however, that the invention is not limited to this use but may be utilized wherever found applicable.

The object of the invention is to provide an improved reversible adjusting mechanism which in an advantageous manner takes care of operating conditions met with in connection with systems such as automatic boiler furnace control systems, and for a consideration of what I believe to be novel and my invention, attention is directed to the accompanying description and the claims appended thereto.

In the drawing, Fig. 1 is a side elevation, partly in section, of a mechanism embodying my invention; Fig. 2 is a detail view showing certain parts in positions different from those of Fig. 1; Fig. 3 is a detail perspective view of certain parts; Figs. 4, 5 and 6 are detail perspective views illustrating the operation of a time limit device; Fig. 7 is a diagrammatic perspective view of the mechanism illustrating its general arrangement; and Fig. 8 is a detail sectional view.

Referring to the drawing, 1 indicates a continuously-running electric motor which drives the mechanism and 2 indicates a sprocket wheel which is operated by the mechanism in one direction or the other and which is connected to the device to be positioned which for the purpose of this description will be referred to as a damp. On the shaft of motor 1 is a pinion 3 which meshes with a gear wheel 4 on a shaft 5. Shaft 5 is carried in suitable bearings 6 in the framework of the mechanism and is rotated continuously by motor 1 and always in the same direction. It may be termed the driving shaft.

Sprocket wheel 2 is fixed on a shaft 7 supported in suitable bearings in the framework of the mechanism. Shaft 7 may be termed the driven shaft.

Loosely mounted on shaft 5 are two spaced driving gear wheels 8 and 9 having opposed clutch teeth formed on their hubs as is indicated at 10 and 11. Located between gear wheels 8 and 9 is a clutch member 12 which is splined to shaft 5 as is indicated at 13 so that it turns with shaft 5. It is adapted to be moved axially on shaft 5 into engagement with either clutch teeth 10 or clutch teeth 11 to thereby connect either gear wheel 8 or gear wheel 9 to driving shaft 5. Gear wheel 8 is connected to a gear wheel 14 on a shaft 15 through a reversing idler 16. Gear wheel 9 meshes directly with a gear wheel 17 on shaft 15. With this arrangement it will be seen that when clutch member 12 is moved into engagement with clutch teeth 10, motor 1 drives shaft 15 in one direction and that when clutch member 12 is moved into engagement with teeth 11 motor 1 drives shaft 15 in the other direction.

On shaft 15 is a pinion 18 which meshes with a gear wheel 19 on a shaft 20; on shaft 20 is a pinion 21 which meshes with a gear wheel 22 on a shaft 23; and on shaft 23 is a pinion 24 which meshes with a gear wheel 25 on driven shaft 7. Through this chain of gearing turning movement in one direction or the other is transmitted from shaft 15 to driven shaft 7 and thence to the draft damper or other device connected to sprocket 2. Clutch member 12 is moved by a lever arm 26 which at its upper end is pivoted on a stud 27 carried by the framework of the mechanism and at its lower end is provided with a yoke 28 which straddles clutch member 12 and carries pins 29 projecting into an annular groove 30, in the clutch member. Lever arm 26 is adapted to be moved by electromagnets 31 and 32, the electromagnet 31 when energized moving clutch member 12 into engagement with clutch teeth 10 and the electromagnet 32 when energized moving the clutch member 12 into engagement with clutch teeth 11. Lever arm 26 is normally held in neutral or central positions as shown in Figs. 1 and 7 by spring-pressed pins 33 which are carried by the framework and engage opposite arms of a yoke 34 which forms a part of lever 26. The electric circuits for electromagnets 31 and 32 are not shown as the particular arrangement used for energizing the electromagnets forms no part of the present invention. They may comprise any suitable arrangement either manually controlled, automatically controlled, or both, whereby either one or the other electromagnet is energized when it is desired to effect adjustment of the damper or other device connected to sprocket 2. For example, they may comprise a master controller such as that disclosed in the application of Erwin G. Bailey, Serial No. 749,769, filed Nov. 13, 1924 or a master controller such as that disclosed in the application of Ralph M. Hardgrove, Sr. No. 239,201, filed December 10, 1927.

Considering the operation of the mechanism so far described, it will be seen that when electromagnet 31 is energized, lever arm 26 is moved to bring clutch member 12 into engagement with clutch teeth 10 thus clutching gear wheel 8 to driving shaft 5 and through the train of gearing turning sprocket wheel 2 in one direction, and that when electromagnet 32 is energized, lever arm 26 is moved to bring clutch member 12 into engagement with clutch teeth 11 thus clutching gear wheel 9 to driving shaft 5 and through the train of gearing turning sprocket wheel 2 in the other direction.

Now, in connection with the mechanism so far described, I provide what I term a time limit mechanism which functions to limit the time which clutch member 12 may remain in engagement with clutch teeth 10 or 11 for one actuation by electromagnet 31 or 32. In other words, I provide a mechanism which limits the amount which sprocket wheel 2, and hence the damper or other device to be adjusted, may be moved when one of the electromagnets is energized, irrespective of how long the magnet remains energized. To this end I provide on shaft 20 a threaded section 35 on which are two round nuts 36 and 37 provided with teeth on their outer surfaces. Nuts 36 and 37 are connected together by a helical torsion spring 38 which surrounds shaft 20 between the two nuts and has its ends connected firmly to the nuts. In uncoiling, the action of spring 38 is in a direction to turn nuts 36 and 37 on threaded section 35 to separate or move the nuts away from each other. The limit of movement of the nuts away from each other is limited by thrust washers 39 which form stops for the nuts. Pivoted adjacent to the nuts are limit latches 40 and 41 each having a tooth 42 for engagement with the teeth on nuts 36 and 37. The pivot points are indicated at 42ª. The latches are held normally from engagement with nuts 36 and 37 by leaf springs 43 fastened to the lower sides of the latches and engaging pins 44 which project from the framework. The latches are turned on their pivots against the action of leaf springs 43 to bring teeth 42 into engagement with the teeth on nuts 36 and 37 by flat springs 45 and 46 carried by yoke 34, the lower ends of springs 45 and 46 being adapted to engage shoulders 47 on the latches. When lever arm 26 moves toward the right as shown in Fig. 7 (the left in Figs. 1 and 2), flat spring 46 pushes against shoulder 47, forcing latch 41 downward to bring its tooth 42 into engagement with the teeth on nut 37. The spring 45 is slightly flexed due to its pushing against shoulder 47 and when the latch has rotated into engagement with the nut, the spring straightens out and takes a position on the latch above shoulder 47, and thereby locks the latch positively in position. This is illustrated in Fig. 2. When arm 26 moves toward the left as shown in Fig. 7, latch 40 is moved by spring 45 into engagement with the teeth on nut 36 and locked in such position. When the nut 36 or 37 is held from turning with shaft 20 by its latch, (and assuming that shaft 20 is turning in one direction or the other) the shaft then turns in the nut and the nut is caused to travel axially along the threads toward lever arm 26. Also, since one nut is now held from turning while the other nut continues to turn with the shaft, spring 38 is unwound and thus placed under tension. It then serves to return the nut to its normal position when it is released by its latch. Projecting from lever arm 26 is a pin 48, the end of which stands between nuts 36 and 37 and is adapted to be engaged by nuts 36 and 37 when they move axially along shaft 20 whereby the nuts may turn lever arm 26 and move clutch member 12 from engagement with clutch teeth 10 or 11. This is shown in Fig. 2 where it will be seen that nut 37 is traveling along the threads on shaft 20 toward the right and is about to engage pin 48 and force lever arm 26 toward the right against the action of electromagnet 32 which is holding the clutch member, to move clutch member 12 from engagement with the teeth on gear wheel 9. As soon as the clutch is disengaged, shaft 20 stops rotating. The arrangement is such, however, that the latch is still held in engagement with the nut by the flat spring 46 so that torsion spring 38 cannot return the nut to its normal position for it will be clear that if it did, electromagnet 32 would again draw clutch member 12 into engagement with clutch teeth 11. The parts will now remain in this position with nut 37 holding the clutch member 12 in out position against the action of electromagnet 32 and spring 46 holding latch 41 in engagement with the teeth on nut 37 until electromagnet 32 is de-energized whereupon spring-pressed pin 33 will force the lever arm 26 back to its neutral position and spring 46 will release latch 41. Torsion spring 38 will now return nut 37 to its normal position. It will thus be seen that when either electromagnet 31 or 32 is energized it effects movement of sprocket wheel 2 but that no matter how long the electromagnet remains energized only a predetermined adjustment can take place and that a further adjustment cannot be effected until the electromagnet has been de-energized and re-energized again.

In connection with the limit mechanism, I provide a total travel limit mechanism which functions to limit in both directions the total travel which can be effected by electromagnets 31 and 32. The travel limit mechanism comprises a travel limit shaft 49 driven by a pinion 50 on driven shaft 7 through a gear wheel 51 and pinion 52 on a shaft 53 and a gear wheel 54 on shaft 49 with which pinion 52 meshes. On one end of shaft 49 are two disks 55 and 56. They are suitably arranged so they can be adjusted around the shaft and relatively to each other and then clamped rigidly to the shaft in their adjusted positions. The specific means utilized for this purpose is not illustrated as any suitable arrangement may be used and the specific arrangement forms no part of the present invention. Projecting from the edge of disk 55 is a segment 57 having a cam surface 58 and a portion 59 which forms a continuation of segment 57; and mounted on disk 56 is a segment 60 having a cam surface 61 similar to cam surface 58 and a portion 62 which forms a continuation of segment 60. Yoke 34 is provided with two inwardly-projecting noses 63 and 64 having beveled cam faces 65 and 66 respectively. Cam surface 58 is adapted to engage cam surface 65 to move lever arm 26 toward the left, Fig. 7, to throw clutch member 12 to out position from engagement with clutch teeth 11 and cam surface 60 is adapted to engage cam surface 66 to move lever arm 26 toward the right, Fig. 7, to throw clutch member 12 to out position from engagement with clutch teeth 10. Cam surface 58 limits the travel of shaft 49 in a clockwise direction as viewed from the left hand end in Fig. 7 and cam surface 61 limits the travel in the opposite direction. Assume that electromagnet 32 is being repeatedly energized to effect successive turning movements of driven shaft 7. The direction of turning of shaft 7 will be clockwise as viewed from the left hand end of Fig. 7. Upon each adjustment segment 57 is brought nearer to cam surface 65 and finally cam surface 58 will engage cam surface 65 forcing lever arm 26 toward neutral position and clutch member 12 from engagement with clutch teeth 11. Lever arm 26 is then permanently held from being again moved by electromagnet 32 and hence further adjustments in this direction by the electromagnet means cannot be effected. Adjustments can be effected, however, in the opposite direction by electromagnet 31. In a similar manner segment 57 limits travel in the opposite direction. In order to prevent chattering of the clutch when a travel limit cam has disengaged the clutch member, I provide a travel limit latch spring 67 adjacent to each of the projecting noses 63 and 64, the end of the spring extending slightly beyond the nose in each instance. The operation of the latch spring 67 is illustrated in Figs. 4, 5 and 6. Fig. 4 shows the cam surface 58 or segment 57 approaching cam surface 65 on projecting nose 63 the direction of movement of cam surface 58 as shown in this figure being upward. As segment 57 continues to move upward cam surface 58 engages cam surface 65 and nose 63 is forced sidewise, thus swinging lever arm 26 on its pivot 27. Latch spring 67 engages the corner of segment 57 and is flexed somewhat as is shown in Fig. 5, and as the movement continues the latch spring, as the clutch kicks out, springs onto the flat surface of segment 57 as is shown in Fig. 6, thus locking the clutch member 12 away from the edge of the adjacent clutch teeth. In this connection it is pointed out that when the clutch is disengaged the extreme ends of the teeth of the clutch have a tendency to ride over each other and drive the clutch lever toward neutral position before the teeth are fully disengaged. The electromagnet then pulls the clutch lever back again and the riding over of the teeth again occurs. This cycle is rapidly repeated causing chattering and resulting in noise and rapid wear of the clutch teeth. The latch spring takes advantage of the slight kick backward of the clutch lever toward the neutral position and springs onto the flat surface of the segment and thus prevents the clutch lever moving back toward clutch engaging position.

After the mechanism has been moved to the desired limit in either direction by repeated operations of the electromagnet means, it may be desirable to permit of further movement by manual means and for this purpose I provide on driven shaft 7 a hand wheel 68 by means of which the shaft may be turned. I then provide a positive limit means for limiting positively the extremes of the adjustment which can be made manually in each direction. For this purpose, I provide a positive stationary stop 69 adjacent to gear wheel 25, such stop being carried by the frame work, and in the gear wheel I provide a counterbored opening 70 in which is located a spring-pressed stop pin 71, the spring normally holding the end of the stop pin within the confines of the gear wheel and out of position to engage stop 69. I then provide means actuated by travel limit shaft 49 for projecting pin 71 outward into a position to engage stop 69 when the limit of travel in either direction is approached. For this purpose, I provide a lever pivoted on the framework as is indicated at 72 comprising two forked arms 73 and 74 which present cam faces 75 adapted for engagement by the end of pin 71. Normally the arms 73 and 74 are positioned so that the end of pin 71 does not engage them as gear wheel 25 is turned. They are moved to a position to be engaged by the head end of pin 71 by pins 76 and 77 carried by disks 78 and 79 on the end of shaft 49, the pin 76 being adapted to engage a cam 80 carried by an arm 81 which forms a continuation of lever arm 74 and the pin 77 being adapted to engage a cam 82 on arm 81. Disks 78 and 79 are adjustable around shaft 49 and relatively to each other (any suitable arrangement being provided to permit of this) and by adjusting disks 78 and 79 around shaft 49, pins 76 and 77 can be located to come into action at the desired times. Assuming that shaft 7 is being turned in a counter clockwise direction as viewed from the left hand end in Fig. 7, then shaft 49 likewise will be turned in a counter clockwise direction but at a slower rate. Finally, however, pin 77, which is in advance of pin 76 as regards this direction of rotation will engage the cam surface of cam 82 and will turn the lever on its pivot 72 bringing arms 73 and 74 toward gear wheel 25 and holding them there. Pin 71 will now be forced by cam surface 75 on arm 74 through the gear wheel and as the gear wheel continues to move, the end of the pin will engage stop 69 positively preventing further turning movement in this direction. In a similar manner, pin 76 functions to move the lever arms 73 and 74 to limit positively turning movement in the other direction.

When driven shaft 7 is moved manually after the cam surface on segment 57 or 60 has moved lever arm 26 to disengage clutch member 12, it is required that segment 57 or 60 shall be effective to continue to hold clutch member 12 disengaged upon the further turning movement of shaft 49 due to the manual turning of shaft 7. This is effected by the extended portions 59 and 62 of segments 57 and 60 along which the ends of noses 63 and 64 and latch springs 67 move. The extended portions 59 and 62 are made long enough so that with the total additional movement of which shaft 49 is capable in any particular instance, the noses and springs will not move beyond them. It will be seen that due to the reduction gearing between driven shaft 7 and shaft 49, a number of revolutions of shaft 7 may be required before the travel limit stop mechanism comprising disks 55 and 56 and the positive limit stop mechanism comprising disks 78 and 79 come into action. Such number of revolutions may be varied by adjusting disks 55 and 56 and disks 78 and 79 on shaft 49 to bring segments 57 and 60 and pins 76 and 77 to different positions around shaft 49. Also the amount of manual adjustment to be effected after clutch member 12 is forced out by segments 57 and 60 may be varied by adjusting pins 76 and 77 relatively to segments 57 and 60, it being understood that in any case extensions 59 and 62 must be made long enough to take care of the amount of manual adjustment provided for.

The operation of the mechanism is believed to be clear from the description already given. It may be summarized as follows:—

Assume that sprocket wheel 2 is connected by suitable means to a draft damper, that the draft damper stands in some intermediate position and that motor 1 is running so that shaft 5 is turning. Assume also that electromagnets 31 and 32 are connected to circuit closing means of an automatic furnace control system whereby upon change in furnace load one or the other of the electromagnets is energized to effect opening or closing movement of the damper as is required. When either electromagnet is energized clutch member 12 is moved to clutch-engaging position to effect transmission of movement from motor 1 to sprocket wheel 2. If the electromagnet remains energized for a time less than that for which the limit travel mechanism is set, then as soon as it is de-energized the parts return to normal positions without travel limit nut 36 or 37 having become effective to move lever arm 26. On the other hand, if the electromagnet remains energized for a time longer than that for which the travel limit mechanism is set, then the travel limit nut 36 or 37 serves to move lever arm 26 to disengage the clutch member after a predetermined adjustment of the damper has taken place. However, as explained above, the travel limit nut is not released to permit the parts to return to their normal positions until the electromagnet is de-energized. Hence only one adjustment of a predetermined amount can be effected by one actuation of an electromagnet.

After predetermined adjustments have taken place in either direction, total travel limit segments 57 and 60 come into action in the manner already explained to limit further operation of the damper by the electromagnets 31 and 32. And following this, upon further operation of the damper manually by wheel 68, positive limit stop means comprising pin 71 and stop 69 comes into operation as already explained to limit positively further adjustment by hand of the damper.

The mechanism possesses the advantages that it is comparatively simple in structure, reliable in operation and comprises comparatively few parts. Also it is compact so that it occupies a comparatively small amount of space. It comprises a unit in itself capable of being used in various kinds of systems and capable of taking care of the operating conditions met with in actual practice.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a mechanism of the character described, the combination of a continuously-running driving shaft, a driven shaft, means including a clutch structure for connecting the driving shaft to the driven shaft, a lever arm for moving the clutch structure to engaging position, automatic means which is brought into action by movement of the lever arm to bring the clutch structure to engaging position for moving the lever arm to bring the clutch structure to disengaging position after the driven shaft has been moved a predetermined amount, and means whereby such movement of the lever arm renders said automatic means inoperative whereby said driven shaft may be moved successively in the same direction by such predetermined amount.

2. In a mechanism of the character described, the combination of a continuously-running driving shaft, a driven shaft, means including a clutch structure for connecting the driving shaft to the driven shaft, a lever arm for moving the clutch structure to engaging position, automatic means for moving the lever arm to bring the clutch structure to disengaging position after the driven shaft has been moved a predetermined amount, and means for limiting the total movement which can be imparted to said shaft by successive actuations of said clutch structure.

3. In a mechanism of the character described, the combination of a continuously-running driving shaft, a driven shaft, means including a clutch structure for connecting the driving shaft to the driven shaft, a lever arm for moving the clutch structure to engaging position, automatic means which is brought into action by movement of the lever arm to bring the clutch structure to engaging position for moving the lever arm to bring the clutch structure to disengaging position after the driven shaft has been moved a predetermined amount, and means for holding said lever arm from clutch-engaging position after said driven shaft has been turned a predetermined amount by successive actuations of said clutch structure.

4. In a mechanism of the character described, the combination of a continuously-running driving shaft, a driven shaft, means including a clutch structure for connecting the driving shaft to the driven shaft, a lever arm for moving the clutch structure to engaging position, automatic means for moving the lever arm to bring the clutch structure to disengaging position after the driven shaft has been moved a predetermined amount, means for limiting the total movement which can be imparted to said shaft by successive actuations of said clutch structure, manually-operable means for the driven shaft, and means for limiting positively the turning movement which can be imparted to said driven shaft by said manually-operable means.

5. In a reversing mechanism, the combination of a driving shaft, a driven shaft, two driving gears loosely mounted on the driving shaft, gear means connecting each of said driving gears to the driven shaft, the connections for one of said driving gears including a reversing idler, a clutch member for clutching either of said driving gears to the driving shaft, a lever arm for moving said clutch member, and means brought into action by movement of the lever arm to bring the clutch structure to engaging position for effecting movement of the lever arm to move the clutch member to disengaging position and restore said last named means to its initial position after the driven shaft has been moved a predetermined amount, whereby said driven shaft may be moved repeatedly by such amount in either direction.

6. In a reversing mechanism, the combination of a driving shaft, a driven shaft, two driving gears loosely mounted on the driving shaft, gear means connecting each of said driving gears to the driven shaft, the connections for one of said driving gears including a reversing idler, a clutch member for clutching either of said driving gears to the driving shaft, a lever arm for moving said clutch member, means brought into action by movement of the lever arm to bring the clutch structure to engaging position for effecting movement of the lever arm to move the clutch member to disengaging position after the driven shaft has been moved a predetermined amount, and means for limiting in each direction the total extent to which the driven shaft can be moved by successive actuations of said clutch member.

7. In a reversing mechanism, the combination of a driving shaft, a driven shaft, two driving gears loosely mounted on the driving shaft, gear means connecting each of said driving gears to the driven shaft, the connections for one of said driving gears including a reversing idler, a clutch member for clutching either of said driving gears to the driving shaft, a lever arm for moving said clutch member, means brought into action by movement of the lever arm to bring the clutch structure to engaging position for effecting movement of the lever arm to move the clutch member to disengaging position after the driven shaft has been moved a predetermined amount, and means actuated by the driven shaft for moving the lever arm to bring the clutch member to non-engaging position and holding it there after the driven shaft has been moved in either direction a predetermined amount by successive actuations of said lever arm.

8. In combination, a driving shaft, a gear wheel loosely mounted thereon, a second shaft, gear means connecting the second shaft to said gear wheel, a clutch member for connecting said gear wheel to said driven shaft, a lever arm for moving said clutch member, a threaded portion on said second shaft, a nut on said threaded portion which nut normally turns with the shaft, a portion of said lever arm standing in line with said nut, and means for holding said nut from turning when the lever arm is moved to bring the clutch member to engaging position whereby said nut will be caused to move along the second shaft into engagement with the lever arm to move the clutch member to non-engaging position.

9. In combination, a driving shaft, a gear wheel loosely mounted thereon, a second shaft, gear means connecting the second shaft to said gear wheel, a clutch member for connecting said gear wheel to said driven shaft, a lever arm for moving said clutch member, a threaded portion on said second shaft, a nut on said threaded portion which nut normally turns with the shaft, a portion of said lever arm standing in line with said nut, means for holding said nut from turning when the lever arm is moved to bring the clutch member to engaging position whereby said nut will be caused to move along the second shaft into engagement with the lever arm to move the clutch member to non-engaging position, and a spring connected to said nut for returning the nut to its initial position when the nut is released.

10. In combination, a driving shaft, a gear wheel loosely mounted thereon, a second shaft, gear means connecting the second shaft to said gear wheel, a clutch member for connecting said gear wheel to said driven shaft, a lever arm for moving said clutch member, a threaded portion on said second shaft, a nut on said threaded portion which nut normally turns with the shaft, a portion of said lever arm standing in line with said nut, and means actuated by movement of the lever arm for holding the nut from turning when the lever arm is moved to bring the clutch member to engaging position whereby said nut will be caused to travel along the second shaft into engagement with the lever arm to move the clutch member to non-engaging position.

11. In combination, a driving shaft, two gear wheels loosely mounted thereon, a second shaft, gear means connecting the second shaft to said gear wheels, said gear means including an idler gear for one of said gear wheels, a clutch member for connecting either of said gear wheels to said driving shaft, a lever arm for moving the clutch member, a threaded portion on said second shaft, spaced nuts on said threaded portion which normally turn with said second shaft, a torsion spring connecting said nuts, said lever arm having a part which stands between said nuts, and means associated with each nut for locking it from turning with the second shaft when the lever arm is moved toward it to bring the clutch member to a clutch-engaging position whereby said nut is caused to travel along the second shaft into engagement with the lever arm to move the clutch member to non-engaging position.

12. In combination, a driving shaft, a driven shaft, a driving gear loosely mounted on the driving shaft, gear means connecting the driving gear to the driven shaft, a clutch member for connecting the driving gear to the driving shaft, a lever arm for moving said clutch member, and travel limit means which engages the lever arm to hold the clutch member in non-engaging position after a predetermined total movement has been imparted to said driven shaft, said travel limit means comprising a leaf spring which functions to keep the clutch from chattering.

13. In combination, a driving shaft, a driven shaft, a driving gear loosely mounted on the driving shaft, gear means connecting the driving gear to the driven shaft, a clutch member for connecting the driving gear to the driving shaft, a lever arm for moving said clutch member, said lever arm having a cam surface, and travel limit means comprising a segment having a cam surface adapted to engage the cam surface on the lever arm to move the lever arm to non-clutch engaging position and hold it in such position.

14. In combination, a driving shaft, a driven shaft, means comprising a clutch member for connecting the driving shaft to the driven shaft, an arm for moving said clutch member to engaging position, manually-operable means for the driven shaft, means for limiting the extent to which said driven shaft may be moved by the driving shaft, said limiting means comprising means for holding the clutch in non-engaging position, and means for limiting the extent to which said driven shaft may be moved by said manually-operable means.

15. In combination, a driving shaft, a driven shaft, means comprising a clutch member for connecting the driving shaft to the driven shaft, an arm for moving said clutch member to engaging position, manually-operable means for the driven shaft, means for limiting the extent to which said driven shaft may be moved by the driving shaft, said limiting means comprising means for holding the clutch in non-engaging position, means for limiting the extent to which said driven shaft may be moved by said manually-operable means, said last-named means comprising a fixed stop, a pin carried by a moving part of the mechanism and means for projecting the pin into a position to engage the stop as the limit of movement of the driven shaft is approached.

16. In combination, a driving shaft, a driven shaft, means comprising a clutch member for connecting the driving shaft to the driven shaft to effect turning of the driven shaft in either direction, an arm for moving the clutch member, said arm being provided with oppositely-arranged cam surfaces, and means providing oppositely-arranged cam surfaces adapted to engage the cam surfaces on said arm to move the clutch member to non-engaging position after the driven shaft has been turned a predetermined amount in either direction.

17. In combination, a driving shaft, a driven shaft, means comprising a clutch member for connecting the driving shaft to the driven shaft to effect turning of the driven shaft in either direction, a lever arm for moving said clutch member, spring means for holding said lever arm in neutral position, electromagnetic means for moving said lever arm against the action of said spring means to move the clutch member to engaging position, means for moving said lever arm against the action of said electromagnetic means to bring the clutch member to non-engaging position and hold it in such position until said electromagnetic means is de-energized.

18. In combination, an arm, means for moving the arm from a neutral position to a second position and means for moving said arm from the second position toward neutral position, said last-named means comprising a rotating shaft having a threaded section, a nut on the threaded section which normally turns with the shaft, and means operated when said arm moves to the second position for holding said nut from turning whereby it is caused to move axially of the shaft.

19. In combination, an arm, means for moving the arm from a neutral position to a position either side of neutral position, and means for moving said arm from either side of neutral position toward neutral position, said last-named means comprising a rotating shaft having a threaded section, spaced nuts on the threaded section which normally turn with the shaft, said nuts being located one on each side of said arm, and means operated when said arm moves from neutral position toward one of said nuts for holding such nut from turning whereby it is caused to move axially of the shaft to effect movement of the arm toward neutral position.

20. In combination, an arm, means for moving the arm from a neutral positon to a position either side of neutral position, means for moving said arm from either side of neutral position toward neutral position, said last-named means comprising a rotating shaft having a threaded section, spaced nuts on the threaded section which normally turn with the shaft, said nuts being located one on each side of said arm, a torsion spring connecting said nuts, and means operated when said arm moves from neutral position toward one of said nuts for holding such nut from turning whereby it is caused to move axially of the shaft to effect movement of the arm toward neutral position, such spring being put under tension to effect return of the nut to its initial position when the nut is released.

21. The combination with a driven shaft and means comprising an arm which is moved from a neutral position to either side of neutral position to effect turning movement of said driven shaft in either direction, of means for moving said arm from either side of neutral position toward neutral position after said driven shaft has turned in either direction a predetermined amount, said last-named means comprising a travel limit shaft driven from the driven shaft, and normally inoperative means carried by the travel limit shaft and put into operation by movement of said arm from neutral position for engaging said arm.

22. The combination with a driven shaft and means comprising an arm which is moved from neutral position to either side of neutral position to effect turning movement of said driven shaft in either direction, of electromagnetic means for moving said arm to either side of neutral position, a travel limit shaft driven from the driven shaft, means carried by the travel limit shaft for moving said arm from either side of neutral position toward neutral position after said driven shaft has turned in either direction a predetermined amount, manually-operable means for turning said driven shaft and means carried by said travel limit shaft for effecting a positive locking of the driven shaft after it has been turned a predetermined amount by said manually-operable means.

23. In a mechanism of the character described, the combination of a continuously running driving shaft, a driven shaft, means including a normally open clutch structure movable in either of two directions for connecting the driving shaft to the driven shaft to effect movement of the driven shaft in either direction, a lever arm for moving the clutch structure from open position to either engaging position, automatic means for moving the lever arm to bring the clutch structure to open position after the driven shaft has been moved a predetermined amount, and means for rendering said automatic means inoperative after the lever arm has been so moved, whereby the lever arm may be again moved in either direction to effect connection of the driving shaft to the driven shaft.

In witness whereof, I have hereunto set my hand this 12th day of January, 1928.

FREDERICK A. BARNES.